March 17, 1942.   D. S. GREER   2,276,481
CANDY COATING
Filed June 19, 1940
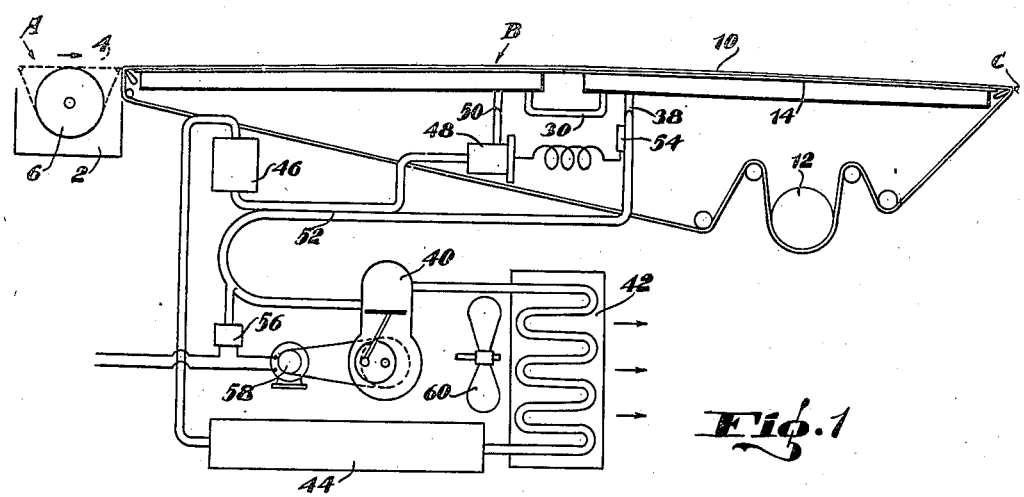
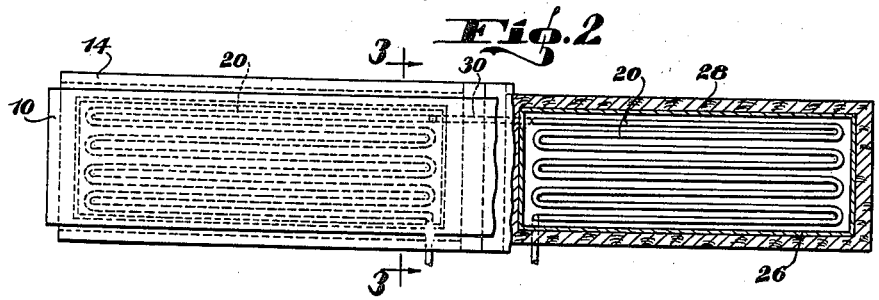
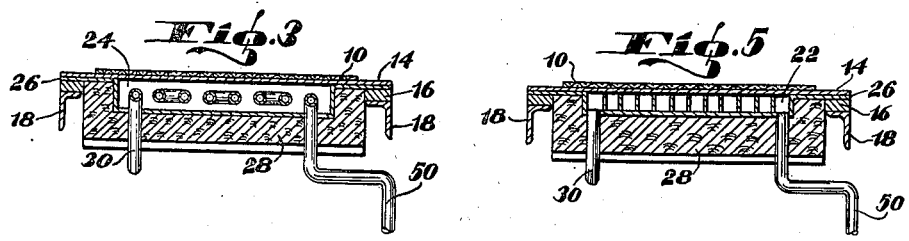
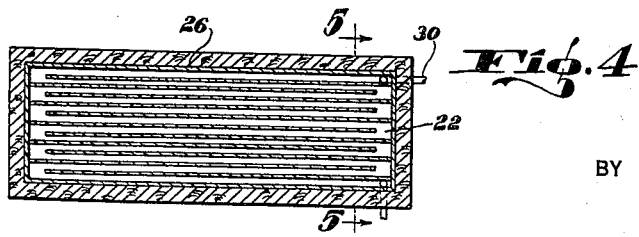
INVENTOR
Don Swint Greer
BY Rowland V. Patrick
ATTORNEY Patented Mar. 17, 1942

2,276,481

UNITED STATES PATENT OFFICE 2,276,481

CANDY COATING

Don Swint Greer, Winchester, Mass., assignor to J. W. Greer Company, Cambridge, Mass., a corporation of Massachusetts Application June 19, 1940, Serial No. 341,343

3 Claims. (Cl. 62—114)

This invention relates to automatic candy coating apparatus, and more particularly to a so-called bottoming machine designed for coating the bottoms of candy centers with a warm liquid coating, such as chocolate, which congeals upon cooling.

In the manufacture of candies which have an exterior coating it is customary, prior to the final coating operation, to precoat the bottom of the centers with some material which will act to reinforce and thicken the bottom of the candy during the regular coating operation and thereafter. This is particularly true where the candy centers are soft or semi-liquid.

As in other automatic candy operations, the bottom coating is generally done while the candy centers are carried by endless conveyor systems. For the bottoming operation, a roll or series of rolls dips into a reservoir of the heated coating substance, for instance chocolate, and transfers the chocolate from the reservoir onto the bottoms of candy centers carried over the tank on an endless wire mesh conveyor, which supports the candy centers.

The centers with the warm soft bottom coatings thereon must then be removed from the wire mesh conveyor and the coatings permitted to cool before further handling is possible. The most efficient manner of removing the centers from the wire conveyor is to transfer them directly onto another endless conveyor, but, with the chocolate coatings on the bottoms still soft and in a semi-liquid condition, the centers tend to stick to any such transfer conveyor, and they cannot be successfully removed therefrom until after hardening of the bottom coatings is substantially complete. Unless artificial cooling is resorted to, the conveyor must have an extensive traverse, or else operation must be at an inefficient slow speed in order to allow sufficient time for hardening. When artificial cooling is provided, the amount of conveyor traverse necessary for maintaining optimum speed of operation is controlled by the rapidity of the cooling.

Space in the usual candy factory is at a premium, while adequate speed of operation is equally important. It is therefore the chief object of the invention to eliminate considerable conveyor traverse in a bottomer apparatus, without reducing speed of operation.

I have further found that the weight of the center causes a detrimental flow of the soft coating from beneath the center when the coating supports the candy center for any length of time. The longer the coating remains soft while supporting the center, the greater the flow. The final coating thus may become much thinner than desired or else there must be a waste of coating material to compensate for the thinning. The apparatus of this invention provides a quick initial chilling which serves to skin over the coating and provide a resistance to flow. Also, the rapidity of the hardening will arrest any flow before it has reached a point where the bottom is noticeably thinned. Coatings of proper thickness are thus insured.

To these ends, and in accordance with this invention, the transfer conveyor belt is carried across and in continuous contact with a plate which is subjected to the heat absorptive capacity of an expansion refrigerant vaporized in close proximity to the conveyor belt, and substantially throughout the area of the traverse. Preferably, the refrigerant is operated in a closed circuit system of the compressor-condenser-evaporator type, with the evaporator being disposed closely adjacent the plate over which the transfer conveyor moves, and the condenser being located at a point remote from the plate.

One example of my bottomer apparatus is illustrated in the drawings, in which,

Fig. 1 is a diagrammatic illustration of the apparatus;

Fig. 2 is a detailed view, partly in plan and partly in section, of a portion of the apparatus;

Fig. 3 is a cross-section taken along the line 3—3 of Fig. 2;

Fig. 4 is a detail section of a modified form of apparatus; and

Fig. 5 is a cross-section taken along the line 5—5 of Fig. 4.

In the drawing, at A, there is indicated diagrammatically a bottom coating apparatus, which includes a tank 2 for holding a reservoir of warmed, liquid coating material, an endless wire belt 4, and a coating roller 6 adapted to transfer liquid coating material, such as chocolate, from the reservoir to the bottoms of candy centers carried by the wire conveyor 4. This coating apparatus may be of any well known type, and may, if desired, include more than one coating roll. At the exit end of the bottomer, as indicated by the arrow, the coated candies are transferred to an endless conveyor system indicated generally at B. This system includes a continuous surface belt 10, as of canvas, driven in any suitable manner, as by the drive roll 12, and having a substantial horizontal traverse, so designed, in connection with other elements of this invention, that the candy centers, upon reaching the exit end of the horizontal traverse of belt 10, have cooled sufficiently for transfer to a third conveyor system C, without presenting difficulties of the bottom coatings sticking to the canvas belt 10. Conveyor C may feed the bottomed centers directly to a further coating machine if desired.

In order to cool the centers during the horizontal traverse on belt 10, the belt moves across a plate 14, which is cooled by a refrigeration system of the compressor-condenser-evaporator type. Close contact between the belt 10 and plate 14 is insured by mounting plate 14 with a longitudinal center rise of any desirable degree as shown. This can readily be accomplished by insertion of a spacer 16 of varying height between the plate and angle irons 18, which support the plate. Directly beneath plate 14, as shown in Figs. 2 and 3, is an evaporator chamber consisting of interconnected refrigerator tubes, which may take the form of a pipe system, as shown in Figs. 2 and 3, or the form of grid passages 22, as shown in Figs. 4 and 5.

Where a pipe system is utilized, a surrounding chamber 24 is provided by a sheet metal element 26. The chamber 24 may either be exhausted to a vacuum or else contain a eutectic solution, such as brine, alcohol, or ethylene glycol. In the modified form shown in Figs. 4 and 5, the plate 14 forms one of the walls of the evaporator tube system. In either case, the bottom of the evaporator system is suitably insulated as at 28.

Generally, it is convenient for construction purposes to utilize two plate units in series, as shown, with a connecting conduit 30, but it is obvious that one or more than two units may be used.

The refrigeration is preferably provided by a closed refrigeration system, which includes a compressor 40, a condenser 42, a storage chamber 44, a dehydrator 46, and an expansion valve 48, connected in the order named, between the outlet 38 from the refrigerant tubes and the inlet 50 thereto. In addition there is shown a heat exchanger 52, a thermostatic control for the expansion valve 54, a pressure control switch 56 for a motor 58 designed to operate compressor 40, and a fan 60 for aiding circulation of air adjacent the condenser 42. All of these are well known elements of one type of refrigerant system. For instance, where the refrigerant used is difluoro-dichloro-methane, the apparatus may be regulated to operate between 26° F. and 50° F. As will be understood, as the pressure rises in the return conduit 38, pressure control switch 56 closes the circuit to the motor 58, thereby starting the compressor 40 to withdraw vapor from the refrigerant tubes 20. The drop in pressure in the refrigerant tubes permits expansion of the compressed liquid, which vaporizes and absorbs heat from the plate 14 and belt 10 to cool the candy centers.

As other examples of suitable refrigerants adapted for use in this system may be mentioned sulphur dioxide, methyl chloride, and ammonia.

As indicated, the entire refrigerator system may be disposed beneath the conveyor B, and therefore requires no additional floor space, while the capacity to operate at low temperatures permits a decrease in the length of the horizontal traverse of belt 10, thereby reducing the overall floor space requirement of the bottoming apparatus. Also, the thickness of the coating may be controlled without encountering flow difficulties.

I claim:

1. In apparatus for bottom coating candy centers having a tank for liquid coating material, an open mesh conveyor having a traverse across said tank and coating means for transferring coating material from said tank to bottoms of candy centers carried by said conveyor, in combination, a plate, a continuous surface conveyor for receiving bottom coated centers from said mesh conveyor, and having a traverse across said plate in continuous surface contact therewith, refrigerating tubes disposed in close proximity to the opposite surface of said plate, means disposed remote from said plate including a compressor and a condenser for compressing and liquefying a refrigerant, conduit means connecting said condenser and said tubes, and means for controlling flow of compressed refrigerant from said condenser into said tubes in response to variation of pressure in said tubes, whereby expansion and vaporization of said refrigerant takes place in said tubes to absorb heat from said plate, thereby cooling said coated centers.

2. In apparatus for bottom coating candy centers having a tank for liquid coating material, an open mesh conveyor having a traverse across said tank and coating means for transferring coating material from said tank to bottoms of candy centers carried by said conveyor, in combination, a plate, a continuous surface conveyor for receiving bottom coated centers from said mesh conveyor, and having a traverse across said plate in continuous surface contact therewith, refrigerating tubes in a closed system disposed in close proximity to the opposite surface of said plate, a liquid-to-vapor-phase-changing type of refrigerant contained in said system, said system including a compressor and a condenser remote from said plate for compressing and liquefying said refrigerant, an expansion valve for controlling flow of said compressed refrigerant from said condenser into said tubes, and means responsive to variation of pressure in said tubes for actuating said compressor to exhaust heated refrigerant vapor from said tubes, thereby cooling said coated centers.

3. In apparatus for bottom coating candy centers having a tank for liquid coating material, an open mesh conveyor having a traverse across said tank and coating means for transferring coating material from said tank to bottoms of candy centers carried by said conveyor, in combination, a continuous surface conveyor for receiving bottom coated centers from said mesh conveyor, and having a generally horizontal traverse, a plate extending intermediate the extremities of said traverse and having a central area arched above the plane passing through said extremities, whereby the length of said traverse is greater than the straight line distance between said extremities, and said belt during advance along said traverse is held in continuous surface contact with said plate, refrigerating tubes disposed in close proximity to the opposite surface of said plate, means disposed remote from said plate including a compressor and a condenser for compressing and liquefying a refrigerant, conduit means connecting said condenser and said tubes, and means for controlling flow of compressed refrigerant from said condenser into said tubes in response to variation of pressure in said tubes, whereby expansion and vaporization of said refrigerant takes place in said tubes to absorb heat from said plate, thereby cooling said coated centers.

DON SWINT GREER.